CAPTIVATED TUBE SHIELD

Filed Dec. 10, 1954

GEORGE W. LONG
*INVENTOR.*

BY Francis W. Crotty

HIS ATTORNEY.

United States Patent Office 2,851,513

Patented Sept. 9, 1958

2,851,513

CAPTIVATED TUBE SHIELD

George W. Long, Villa Park, Ill., assignor to Zenith Radio Corporation, a corporation of Delaware Application December 10, 1954, Serial No. 474,480

1 Claim. (Cl. 174—35)

This invention relates to shielding arrangements, and more particularly to arrangements for shielding electron-discharge devices employed in radio and television apparatus and the like.

There are many applications in which it is necessary or desirable to provide electrical shielding for an electron-discharge device. In particular, the local oscillator stages of superheterodyne radio and television receivers often require shielding to prevent radiation of the local oscillator signal from the receiver and consequent interference with the operation of neighboring receivers. Such shielding is particularly required in the local oscillator stage of high-frequency equipment such as present day V. H. F. and U. H. F. television receivers.

Modern design trends have led toward the use of more compact and less expensive cabinet constructions, particularly in the home receiver field. At the present time, numerous manufacturers are employing television receiver cabinets of metal construction, both because of favorable cost considerations and because of the versatility and adaptability of such cabinets to modern design approaches. Moreover, the trend toward less expensive television receivers often leads to the use of so-called "hot chassis" designs in which the receiver chassis is conductively connected to one side of the power line and therefore may be maintained at a substantial voltage with respect to ground. When such receivers are employed in metal cabinets, it is obviously necessary to insulate the chassis from the cabinet to avoid any possibility of electrical shock in normal operation. In such receivers there is an additional hazard when conductive tube shields are employed; if for any reason the shield is removed from the associated tube and is dropped or slips into contact with the chassis, it may cause a short circuit of the chassis to the metal cabinet leading to electrical shock to the operator if not more serious consequences.

It is an important object of the present invention to provide a captivating arrangement for use with a conductive tube shield to prevent inadvertent or undesirable short circuiting of a metal chassis to an enclosing metal cabinet.

The objects of the invention are achieved in apparatus comprising a metal chassis with circuit means including an electron-discharge device mounted on the chassis by providing a conductive tube shield encompassing the electron-discharge device. The shield is provided with a laterally extending loop and is captivated by means including a guide rail fixed to the chassis and extending through the loop.

Figure 1:
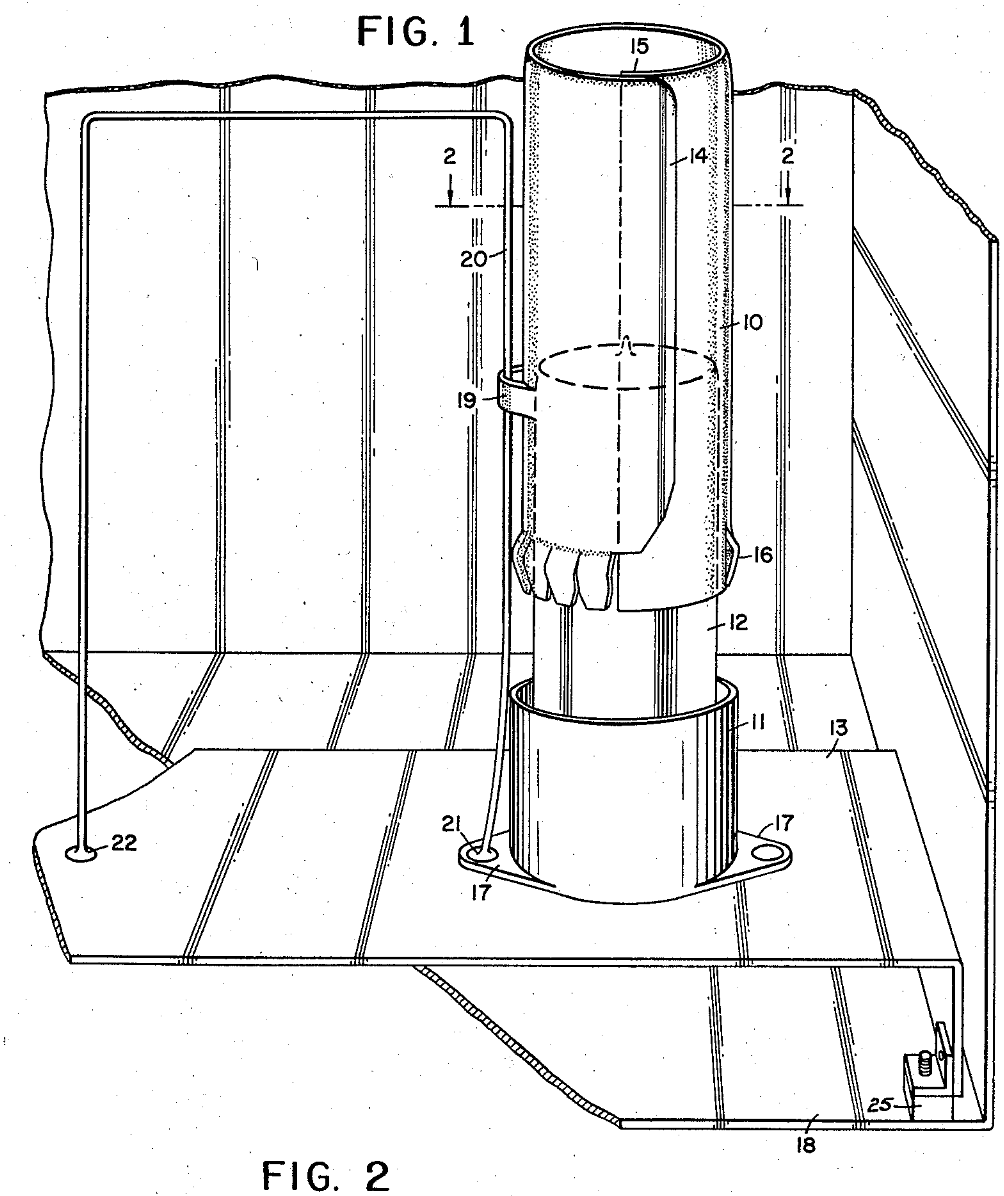
Figure 2:
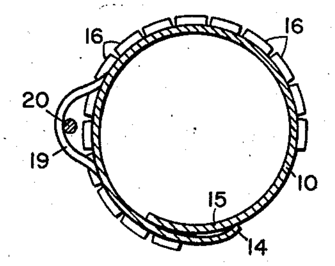

The features of the present invention which are believed to be novel are set forth with particularity in the appended claim. The organization and manner of operation of the invention, together with further objects and advantages thereof, may best be understood by reference to the following description taken in connection with the accompanying drawing, in which:

Figure 1 is a fragmentary perspective view of a portion of a radio receiver or the like comprising an electron-discharge device and embodying the present invention; and Figure 2 is a cross-sectional view taken along the line 2—2 of Figure 1.

As shown in Figure 1, an embodiment of the present invention may comprise a resilient sheet metal shield member 10 and a generally cylindrical saddle 11 adapted for use with an electron-discharge device 12 mounted on the chassis 13 of a radio receiver or the like. The shield member 10 is of generally cylindrical configuration and is provided with tightly overlapping paraxial edges 14 and 15 with its natural resiliency being such as to maintain its diameter normally less than that of the envelope of the electron-discharge device 12 with which it is to be employed. Upon insertion of tube 12 in shield 10, the shield expands and is therefore maintained in intimate physical contact with the envelope of device 12. Shield 10 is also provided with a plurality of integral spring fingers 16 at one end. Each of the spring fingers is preferably formed by conventional punching and stamping operations and is formed with an outwardly convex curvature in the manner shown to provide an outwardly biased contact with the inner surface of saddle 11.

As shown, saddle 11 is formed as a simple cylindrical metal member encompassing the base of tube 12 and provided with lateral flanges 17 to facilitate mounting to the chassis. However, other constructions for saddle 11 may also be employed if desired; for example a sectionalized- or mutilated-cylindrical saddle containing two or more cylindrical segments or deformed to correspond to the curvature of spring fingers 16 may be employed.

When shield 10 is slipped over the envelope of tube 12 and pressed downwardly to cause engagement of spring fingers 16 with the inner surface of saddle 11, complete electrical shielding is realized since tube 12 is completely surrounded with material of high conductivity. Spring fingers 16, being biased into firm engagement with conductive saddle 11, provide adequate grounding of the shield to the chassis. In addition, spring fingers 16 maintain excellent thermal contact with saddle 11, and since shield 10 is maintained in intimate engagement or contact with the envelope of tube 12, heat generated by the tube during operation of the equipment is normally transferred by conduction to the shield and then through spring fingers 16 to saddle 11 and chassis 13 to assure rapid and efficient heat dissipation.

For best results, the outermost edge 14 of shield 10 is rolled inwardly as most clearly indicated in Figure 2 so that insertion of tube 12 forces the innermost overlapping edge outwardly into firm engagement with edge 14 along its full length. This arrangement prevents substantial "leakage" or inadequacy of electrical shielding which might otherwise be encountered.

The construction of shield 10 and saddle 11 and the cooperative combination therebetween are specifically described and claimed in the copending application of Edward P. Reardon, Serial No. 474,485, filed concurrently herewith and assigned to the present assignee.

When the equipment is of the type in which one side of the associated power cord (not shown) is conductively connected to the chassis 13 (i. e. the so-called "hot chassis" construction) and is mounted in a metal cabinet 18 by means including insulating block 25 to avoid direct connection of the power cord to the cabinet, difficulty has been encountered on occasion when the conductive tube shields are removed to permit replacement of the associated tubes, for in some instances the shield may slip from the hand of the service man into short circuiting contact between chassis 13 and cabinet 18. In the past, these difficulties have been avoided by constructing the tube shield of cardboard or the like with an inner metallic foil coating; this arrangement provides effective electrical shielding but in many instances has been found to lead to excessive operating temperatures and consequent significant decrease in tube life as well as unnecessarily poor signal-to-noise ratios in V. H. F. and U. H. F. circuits.

In accordance with the present invention, shield 10 is provided with a laterally extending loop 19 preferably integral with the body of the shield which may be formed by conventional punching and stamping operations. A guide rail 20, which may take the form of a simple piano wire or other material having the necessary structural attributes of strength and resiliency, is anchored to chassis 13 as by a simple solder connection 21. Guide rail 20 extends through loop 19 of tube shield 10 and is constructed at its other end to preclude removal of the shield in order to captivate it against inadvertent or undesirable short circuiting between chassis 13 and cabinet 18. For example, in the illustrated embodiment, guide rail 20 is formed as a U-shaped member which is soldered to chassis 13 at its free end 22 in addition to the previously mentioned connection 21; this arrangement is particularly advantageous when there are two closely situated tubes each requiring electrical shielding, for associated tube shields for both devices may thus be captivated by a single guide rail. Alternatively, guide rail 20 may be constructed of more rigid material and be provided at its upper extremity with a loop or other termination larger than the opening in loop 19 to prevent withdrawal of the shield.

Thus the invention provides a simple and inexpensive captivating arrangement for preventing short circuiting between a metal cabinet and a closed conductive chassis. The required modification of the tube shield is slight and may be accomplished with little or no expense while the provision of the guide rail presents no substantial manufacturing difficulties and represents a relatively insignificant contribution to the overall cost of the apparatus. The arrangement permits the use of tube shields of all-metal construction in "hot chassis" receivers having all-metal cabinets thus avoiding the necessity for foil-lined cardboard shields and permitting the maintenance of lower operating temperatures with consequent improvements in tube life and signal-to-noise ratio.

While a particular embodiment of the invention has been shown and described, it will be obvious to those skilled in the art that changes and modifications may be made, and therefore the aim in the appended claim is to cover all such changes and modifications as fall within the true spirit and scope of the invention.

I claim:

In combination: a metal cabinet; a metal chassis mounted within said cabinet and electrically insulated therefrom; circuit means including an electron discharge device mounted on said chassis; a metal tube shield encompassing said electron-discharge device; a laterally extending loop fixed to said shield; means for preventing said shield from contacting said cabinet, said means including a guide rail extending through said loop and fixed to said chassis at one end; and further means provided at the other end of said rail comprising a retaining structure incapable of passing through said loop for preventing accidental short-circuiting of said chassis to said cabinet by said shield upon its removal from said device.

References Cited in the file of this patent

UNITED STATES PATENTS

| | | |
|---|---|---|
| 409,264 | Wright | Aug. 20, 1889 |
| 602,822 | Boynton | Apr. 26, 1898 |
| 2,499,612 | Staver | Mar. 7, 1950 |
| 2,627,996 | Dorner | Feb. 10, 1953 |